United States Patent
Lee et al.

(10) Patent No.: US 9,366,802 B2
(45) Date of Patent: Jun. 14, 2016

(54) CURVED DISPLAY DEVICE

(71) Applicant: Samsung Display Co., Ltd., Yongin, Gyeonggi-Do (KR)

(72) Inventors: Cheolse Lee, Daegu (KR); Jeongman Son, Suwon-si (KR); Cheong Hun Lee, Asan-si (KR); JinYoung Lee, Cheonan-si (KR); Yun-Gun Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 38 days.

(21) Appl. No.: 14/156,658

(22) Filed: Jan. 16, 2014

(65) Prior Publication Data

US 2015/0036077 A1 Feb. 5, 2015

(30) Foreign Application Priority Data

Aug. 2, 2013 (KR) .................... 10-2013-0092194

(51) Int. Cl.
*G02F 1/1333* (2006.01)
*G02F 1/1335* (2006.01)
*F21V 8/00* (2006.01)
*H05K 5/02* (2006.01)

(52) U.S. Cl.
CPC ............... *G02B 6/0081* (2013.01); *H05K 5/02* (2013.01)

(58) Field of Classification Search
CPC ..... G09F 9/35; G09F 9/301; G02F 1/133308; G02F 2001/133314; G02F 2001/13332; G02F 2001/133322; G02F 2201/56; G02B 6/0081; H05K 5/02

USPC ....................................................... 349/58, 65
See application file for complete search history.

(56) References Cited

U.S. PATENT DOCUMENTS

| | | | |
|---|---|---|---|
| 6,332,690 B1 * | 12/2001 | Murofushi | .................... 362/611 |
| 2002/0001187 A1 | 1/2002 | Murofushi | |
| 2005/0117197 A1 | 6/2005 | Ide | |
| 2006/0268386 A1 | 11/2006 | Selbrede et al. | |
| 2007/0103776 A1 | 5/2007 | Cok et al. | |
| 2007/0139605 A1 | 6/2007 | Matsuda et al. | |
| 2007/0146569 A1 | 6/2007 | Nouchi et al. | |
| 2007/0146616 A1 | 6/2007 | Nouchi et al. | |
| 2008/0303976 A1 | 12/2008 | Nishizawa et al. | |
| 2009/0015747 A1 | 1/2009 | Nishizawa et al. | |
| 2009/0021162 A1 | 1/2009 | Cope et al. | |
| 2009/0096965 A1 | 4/2009 | Nagata | |
| 2009/0122223 A1 | 5/2009 | Hayano et al. | |
| 2009/0201137 A1 * | 8/2009 | Weller | ...................... B60R 1/12 340/425.5 |
| 2009/0201443 A1 | 8/2009 | Sasaki et al. | |

(Continued)

FOREIGN PATENT DOCUMENTS

| | | |
|---|---|---|
| JP | 2010-008875 A | 1/2010 |
| JP | 2010-217702 A | 9/2010 |

(Continued)

*Primary Examiner* — Nathanael R Briggs
(74) *Attorney, Agent, or Firm* — Cantor Colburn LLP

(57) ABSTRACT

A curved display device includes a display panel having a display area on which an image is displayed; a receiving member receiving the display panel; and a cover member covering a border of the display panel to combine with the receiving member. The display panel has a bent shape along a first direction and a second direction crossing the first direction and each of the receiving member and the cover member is bent to maintain the bent shape of the display panel.

21 Claims, 12 Drawing Sheets

(56) References Cited

U.S. PATENT DOCUMENTS

| | | |
|---|---|---|
| 2009/0284904 A1 | 11/2009 | Wu et al. |
| 2009/0316062 A1 | 12/2009 | Nishizawa |
| 2010/0033648 A1 | 2/2010 | Kaganezawa |
| 2010/0147030 A1 | 6/2010 | Rietbergen et al. |
| 2010/0164860 A1 | 7/2010 | Misono |
| 2010/0238370 A1 | 9/2010 | Matsumoto |
| 2010/0289983 A1 | 11/2010 | Rocard et al. |
| 2011/0019129 A1 | 1/2011 | Nishizawa et al. |
| 2011/0090713 A1 | 4/2011 | Chen et al. |
| 2011/0096262 A1* | 4/2011 | Kikuchi ......................... 349/58 |
| 2011/0228190 A1 | 9/2011 | Yang et al. |
| 2011/0255039 A1 | 10/2011 | Enomoto |
| 2012/0020056 A1 | 1/2012 | Yamagata et al. |
| 2012/0044618 A1 | 2/2012 | Lee |
| 2012/0320509 A1 | 12/2012 | Kim et al. |
| 2013/0321740 A1* | 12/2013 | An ...................... H05K 5/0217 349/58 |

FOREIGN PATENT DOCUMENTS

| | | |
|---|---|---|
| JP | 2011-085740 A | 4/2011 |
| KR | 1020120119111 A | 10/2012 |

\* cited by examiner

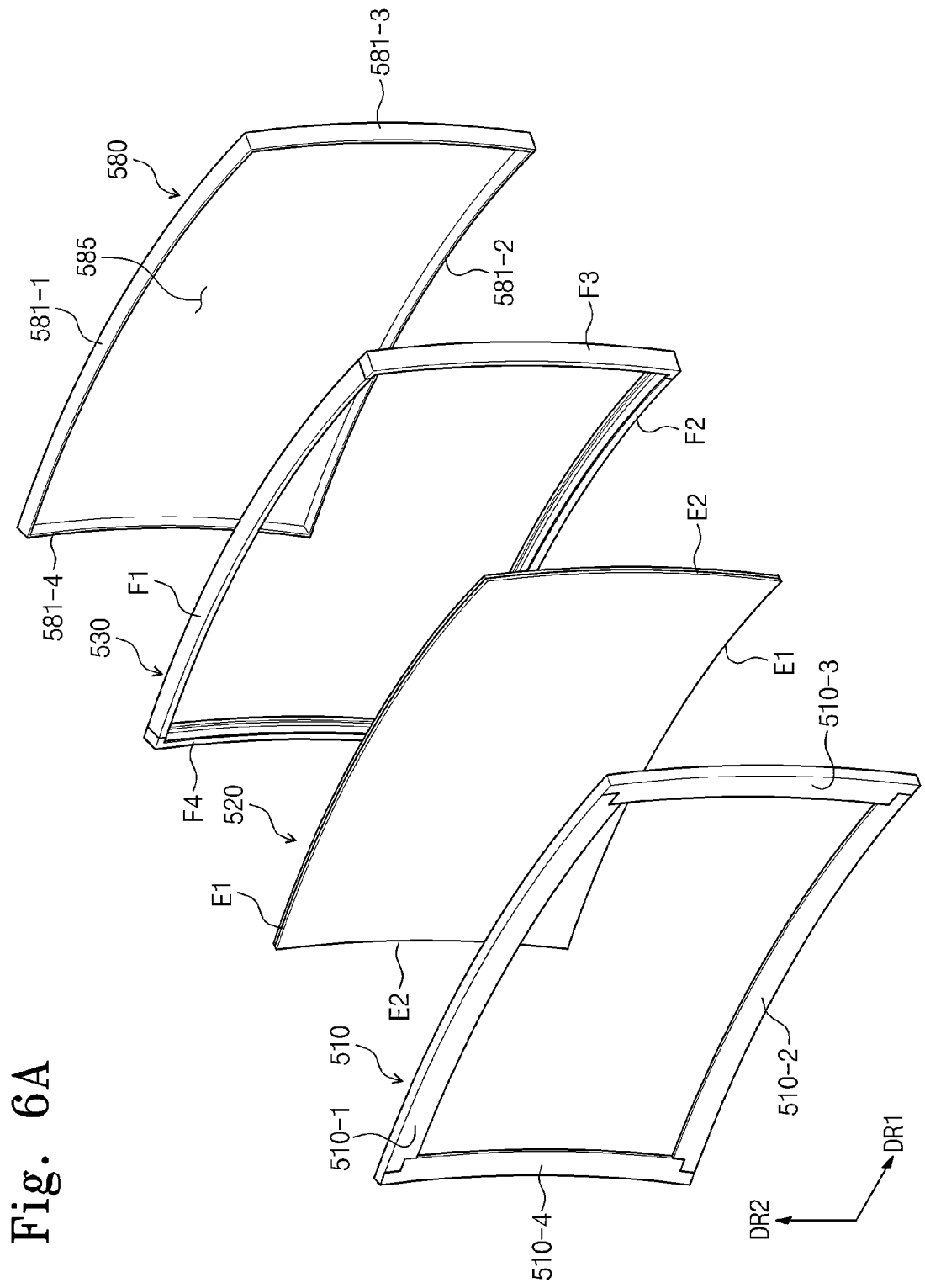

CURVED DISPLAY DEVICE

This application claims priority to Korean Patent Application No. 10-2013-0092194, filed on Aug. 2, 2013, and all the benefits accruing therefrom under 35 U.S.C. §119, the entire contents of which are hereby incorporated by reference.

BACKGROUND (1) Field

The invention described herein relates to curved display devices, and more particularly, to a curved display device of which a display area has a curved shape.

(2) Description of the Related Art

A flat panel display device such as a liquid crystal display device and an organic electroluminescence display device is being used to display an image in various information processing units such as a television, a monitor, a notebook and a cellular phone. A curved display device using the flat panel display device is being developed. The curved display device can form a display area having a curved shape to provide an image having improved three-dimensional effect, sense of immersion and realism to a user.

SUMMARY

One or more exemplary embodiment of the invention provides a curved display device. The curved display device includes a display panel comprising a display area on which an image is displayed; a receiving member which receives the display panel; and a cover member which covers a border of the display panel and is combined with the receiving member. The display panel is curved along a first direction, and a second direction crossing the first direction. Each of the receiving member and the cover member is curved and maintains the curved shape of the display panel.

BRIEF DESCRIPTION OF THE FIGURES

The above and other features of this disclosure will become more apparent by describing in further detail exemplary embodiments thereof with reference to the accompanying drawings, in which:

FIG. 6A is an enlarged perspective view of an exemplary embodiment of a cover member, a mold frame and a receiving member illustrated in FIG. 2A.

DETAILED DESCRIPTION

Figure 1A:
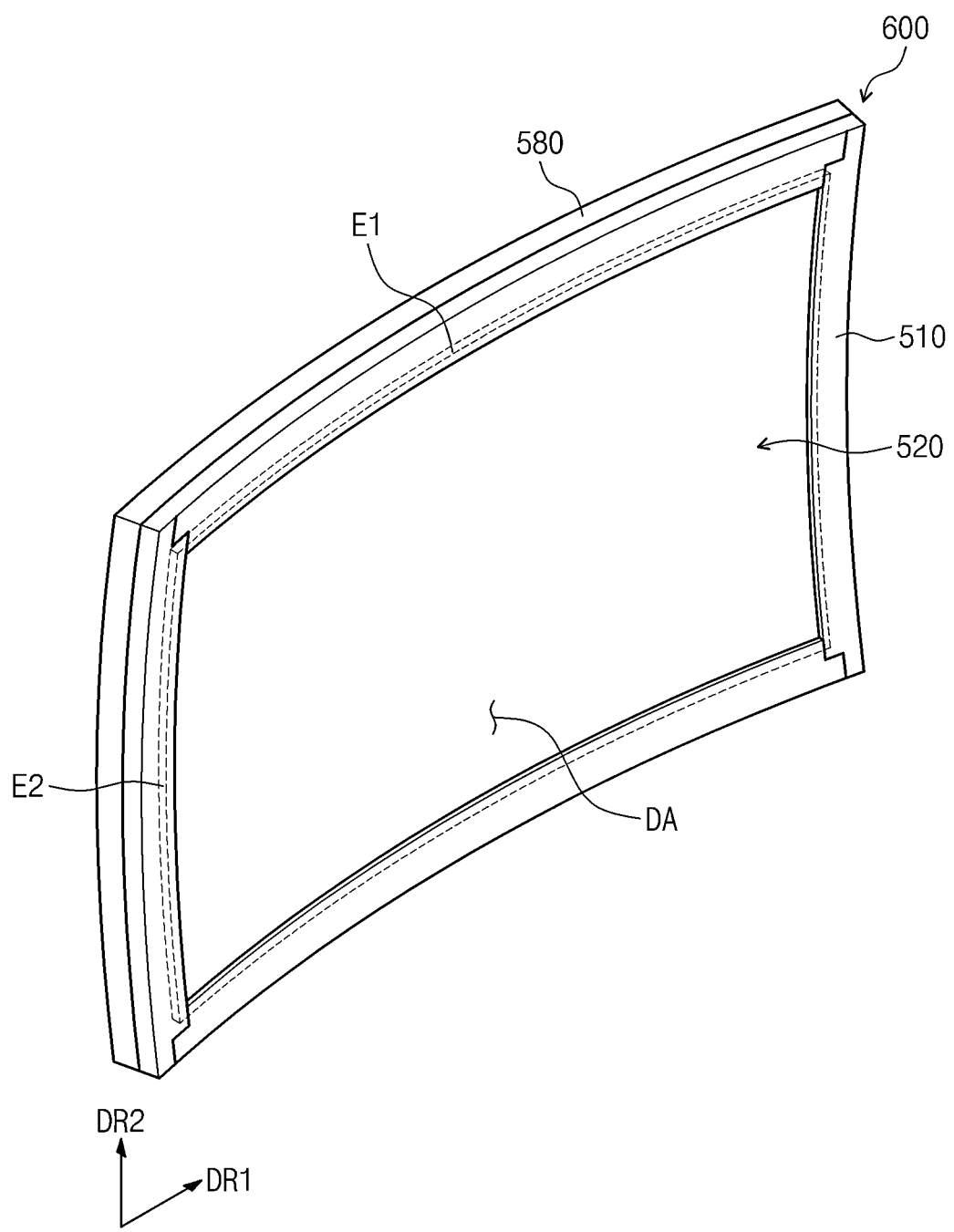
FIG. 1A is a perspective view of an exemplary embodiment of a curved display device in accordance with the invention.

Exemplary embodiments of invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically, and/or electrically connected to each other. As used herein, the term "and/or" includes any and all combinations of one or more of the associated listed items. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "above" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Figure 1B:
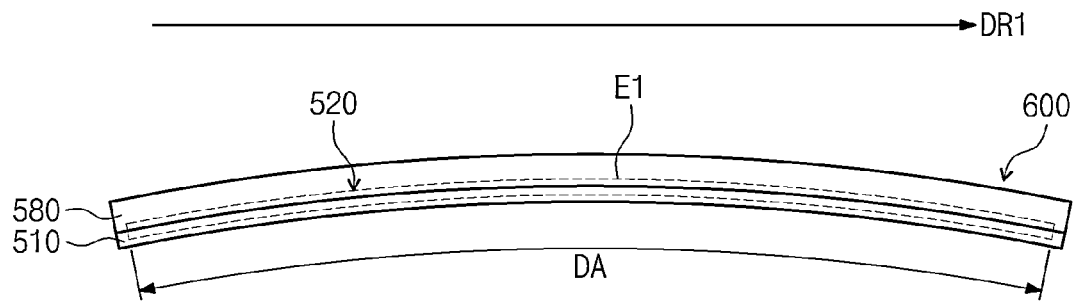
FIG. 1B is a top cross-sectional view of the curved display device illustrated in FIG. 1A.
Figure 1C:
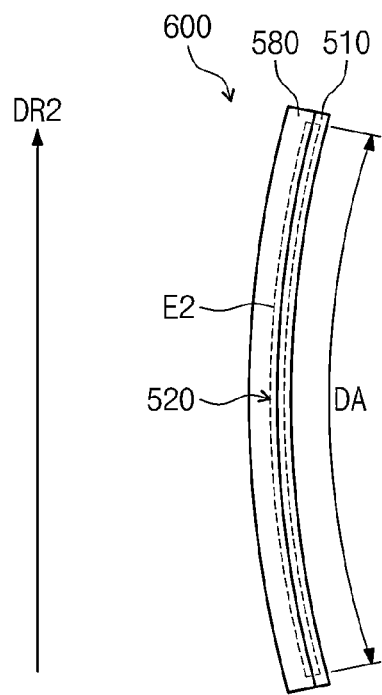
FIG. 1C is a side cross-sectional view of the curved display device illustrated in FIG. 1A.

FIG. 1A is a perspective view of an exemplary embodiment of a curved display device in accordance with the invention. FIG. 1B is a top cross-sectional view of the curved display device illustrated in FIG. 1A. FIG. 1C is a side cross-sectional view of the curved display device illustrated in FIG. 1A.

Referring to FIGS. 1A, 1B and 1C, a curved display device 600 has a bent shape. The curved display device 600 may have a bent (e.g., curved) shape along a first direction DR1, and a second direction DR2 crossing the first direction DR1. In the illustrated embodiment, the first direction DR1 and the second direction DR2 can be perpendicular to each other, but are not limited thereto.

The curved display device 600 includes a receiving member 580, a display panel 520, a backlight (500 of FIG. 2A) and a cover member 510. The display panel 520 may be a liquid crystal display panel, but is not limited thereto. The backlight 500 outputs a light to the display panel 520 and the display panel 520 receives the light output from the backlight 500 to display an image through a display area DA.

The display panel 520 can have a bent shape corresponding to the bent shape of the curved display device 600. That is, the display panel 520 can have a bent shape the first and second directions DR1 and DR2. Thus, when a longer side E1 and a shorter side E2 are defined on the display panel 520, the longer side E1 is bent along the first direction DR1 and the shorter side E2 is bent along the second direction DR2.

As described above, when the display panel 520 has a bent shape, the display area DA of the display panel 520 may have a curved shape. Thus, through the display area DA having the curved shape, the curved display device 600 can display an image having improved three-dimensional effect, sense of immersion and realism.

The receiving member 580 receives the display panel 520 and the backlight 500 therein, and the cover member 510 combines with the receiving member 580 including the display panel 520 and the backlight 500 received therein. The cover member 510 covers edges of the display panel 520, and thereby the display area DA surrounded by the edges of the display panel 520 can be exposed by the cover member 510 to outside the cover member 510.

The cover member 510 and the receiving member 580 are bent to correspond to a shape of the display panel 520, and thereby a bent shape of the display panel 520 can be maintained.

In the following description, elements of the curved display device 600 are further described in detail.

Figure 2A:
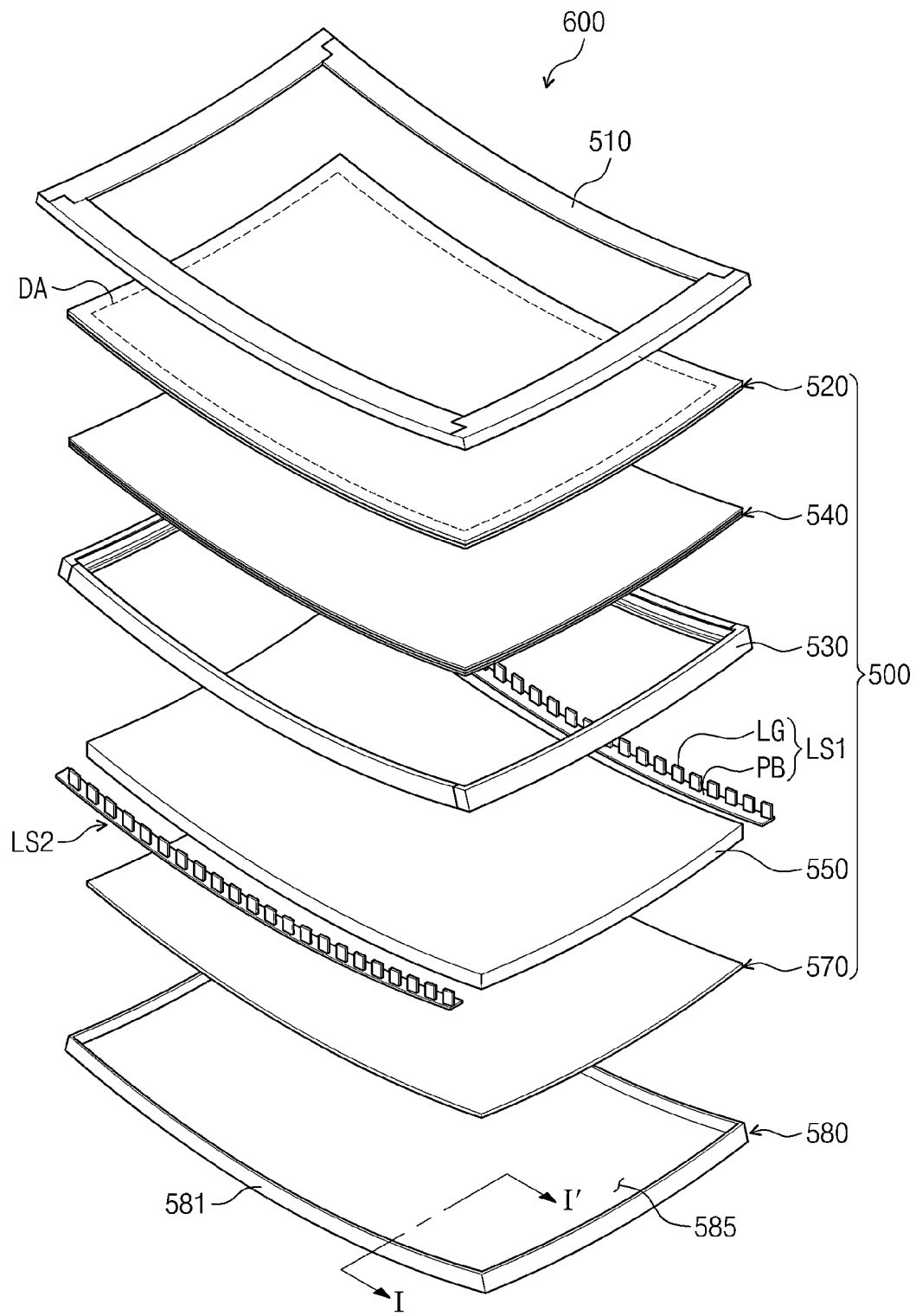
FIG. 2A is an exploded perspective view of the curved display device illustrated in FIG. 1A.
Figure 2B:
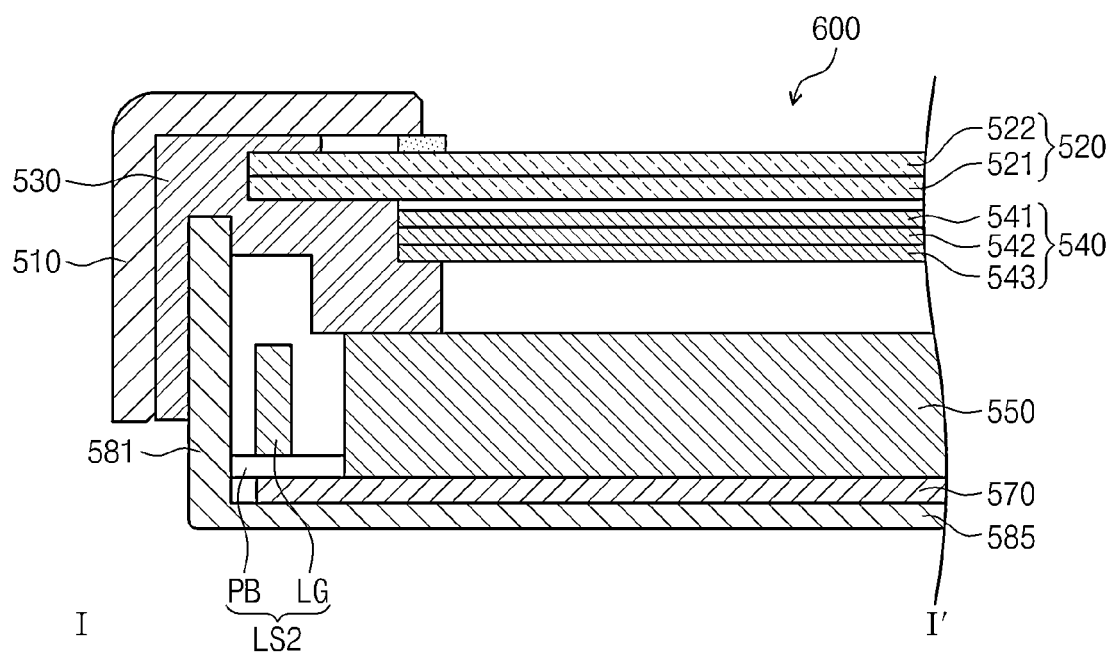
FIG. 2B is a cross sectional view taken along line I-I' of FIG. 2A.

FIG. 2A is an exploded perspective view of the curved display device illustrated in FIG. 1A. FIG. 2B is a cross-sectional view taken along line I-I' of FIG. 2A.

Referring to FIGS. 2A and 2B, the display panel 520 may be a liquid crystal display panel and may include a display substrate 521, a counter substrate 522 and a liquid crystal layer (not shown) interposed between the display substrate 521 and the counter substrate 522. The display substrate 521 may include a first base substrate (not shown) such as a glass or plastic substrate, and a plurality of pixel electrodes (not shown) disposed on the first base substrate. The counter substrate 522 may include a second base substrate (not shown) such as a glass or plastic substrate, and a common electrode (not shown) disposed on the second base substrate and which forms an electric field in the liquid crystal layer together with the pixel electrodes of the display substrate 521.

In the exemplary embodiment, the display panel 520 is a liquid crystal panel but the invention is not limited thereto. In other exemplary embodiments, the display panel 520 may be an organic electroluminescence display panel or a plasma display panel. Since the organic electroluminescence display panel or the plasma display panel autonomously emits light to display an image, the backlight 500 can be omitted in the curved display device 600 including the organic electroluminescence display panel or the plasma display panel as the display panel 520.

The backlight 500 includes a first light source LS1, a second light source LS2, a reflecting plate 570, a light guide plate 550, a mold frame 530 and multiple sheets 540 such as a plurality of optical sheets.

The first and second light sources LS1 and LS2 each generate and emit light. In the exemplary embodiment, the first and second light sources LS1 and LS2 may include a printed circuit board PB, and multiple light emitting diode packages LG mounted on the printed circuit board PB, to generate and emit the light. The first light source LS1 can be disposed to be adjacent to a first side of the light guide plate 550 and the second light source LS2 can be disposed to be adjacent to an opposing second side of the light guide plate 550. Thus, light generated by the multiple light emitting diode packages LG can enter the light guide plate 550 through the opposing sides of the light guide plate 550, such as through two light incident sides of the light guide plate 550. The light guide plate 550 may include a light exiting surface facing the display panel 520, a rear surface which is opposite to the light exiting surface and faces the receiving member 580, and side surfaces which connect the light exiting and rear surfaces to each other.

The reflecting plate 570 includes a material which reflects light, such as polyethylene terephthalate and aluminum, and is disposed on a bottom portion 585 of the receiving member 580. The light guide plate 550 is received in the receiving member 580 and is disposed on the reflecting plate 570. The light guide plate 550 guides light provided from the first and second light sources LS1 and LS2 toward the display panel 520.

The mold frame 530 combines with the receiving member 580. More specifically, the mold frame 530 extends along side walls 581 of the receiving member 580 and is combined with the side walls 581. The mold frame 530 fixes an edge of the light guide plate 550 received in the receiving member 580, onto the bottom portion 585. The multiple sheets 540 and the display panel 520 are sequentially disposed on the mold frame 530.

The multiple sheets 540 are disposed between the display panel 520 and the light guide plate 550. In the illustrated exemplary embodiment, the multiple sheets 540 includes a diffusion sheet 543 configured to diffuse light, a prism sheet 542 configured to concentrate light to improve front brightness of the display panel 520 and a protection sheet 541 configured to protect a back of the display panel 520.

The invention is not limited to the elements of the backlight 500 described above. In other exemplary embodiments, multiple lamps can be disposed between and overlapping the display panel 520 and the reflecting plate 570, instead of the first light source LS1, the second light source LS2 and the light guide plate 550. Multiple lamps can be disposed on and overlapping the display area DA of the display panel 520 at regular intervals, and a diffusion plate diffusing light can be disposed between the display panel 520 and the multiple lamps. In still other exemplary embodiments, instead of the backlight 500 including the reflecting plate 570, the bottom portion 585 of the receiving member 580 can include a reflective material or a reflecting layer coated thereon.

Figure 3:
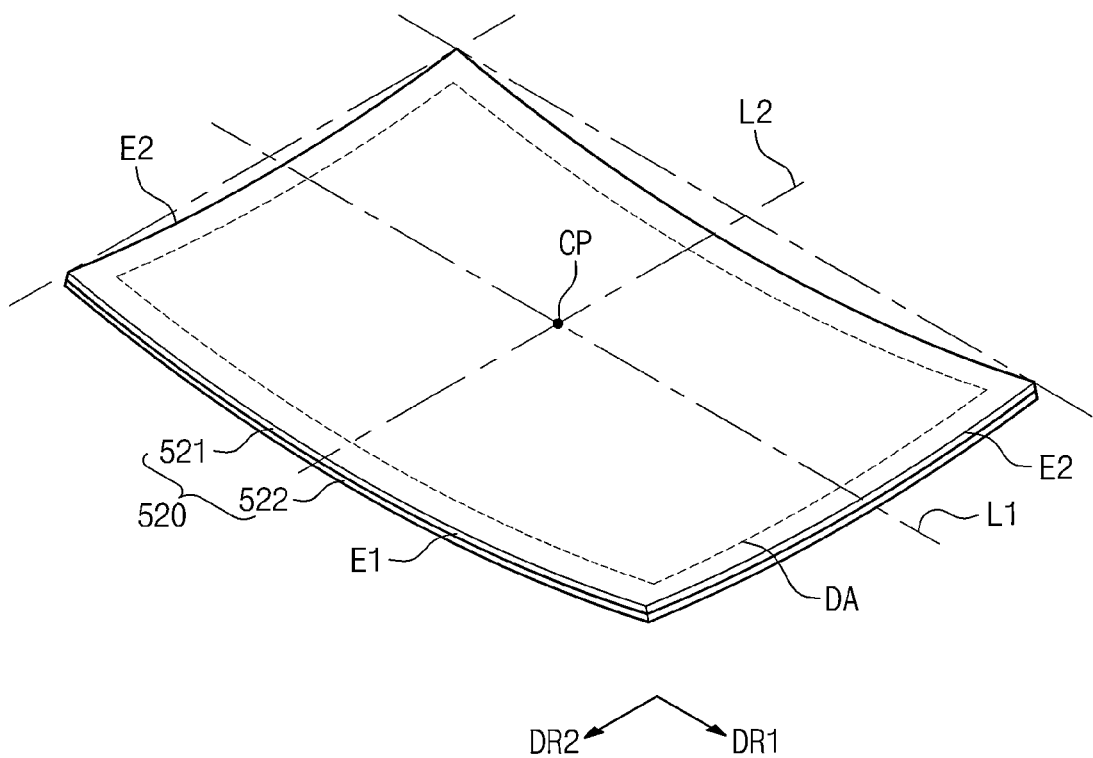
FIG. 3 is an enlarged view of an exemplary embodiment of a display panel illustrated in FIG. 2A.

FIG. 3 is an enlarged view of an exemplary embodiment of a display panel illustrated in FIG. 2A.

Referring to FIG. 3, the display panel 520 has a bent shape along the first direction DR1 and the second direction DR2. Thus, if two longer sides E1 and two shorter sides E2 are defined on the display panel 520, each of the two longer sides E1 is bent along the first direction DR1 and each of the two shorter sides E2 is bent along the second direction DR2.

Since curvature radii of the two longer sides E1 are the same and curvature radii of the two shorter sides E2 are the same, in the following description, one longer side E1 and one shorter side E2 are described.

If the longer side E1 has a first curvature radius and the shorter side E2 has a second curvature radius, the second curvature radius of the shorter side D2 is greater than the first curvature radius of the longer side E1. Thus, since the curvature of the shorter side E2 is greater than the curvature of the longer side E1, the shorter side E2 is more gently bent than the longer side E1.

A structure in which the display panel 520 is bent along the first and second directions DR1 and DR2 is defined as a double-curved structure. A structure in which the display panel 520 is bent only along the first direction DR1 (or the second direction DR2) is defined as a single-curved structure.

Where the display panel 520 has the single-curved structure, a stress can be concentrated on a part of a base substrate such as a glass or plastic substrate included in the display panel 520. As a result, a refractive index of light passing through the part of the base substrate on which the stress is concentrated can be different depending on directions in which light travels and retardation can occur in the light passing through the base substrate. Generally, the base substrate included in the display panel 520 has a non-optical characteristic such as having a transparent characteristic, but where retardation occurs in the light passing through the base substrate, the retardation can function as a factor degrading display quality of the display panel 520.

However, where the display panel 520 has the double-curved structure, a stress locally applied to the base substrate of the display panel 520 can be dispersed and thereby retardation of light passing through the base substrate can be reduced or effectively prevented and a non-optical characteristic of the base substrate can be maintained. Thus, a phenomenon (e.g., a light leakage) which causes display quality of the display panel 520 to degrade by the retardation, can be reduced or effectively prevented.

If a first virtual line L1 which passes through a central point CP of the display panel 520 and is in parallel to the first direction DR1, and a second virtual line L2 which passes through a central point CP of the display panel 520 and is in parallel to the second direction DR2 are defined, a bent shape of the display panel 520 may be symmetrical with respect to the first virtual line L1 and the second virtual line L2 respectively. As a result, the display area DA of the display panel 520 can have a concave shape.

Figure 4A:
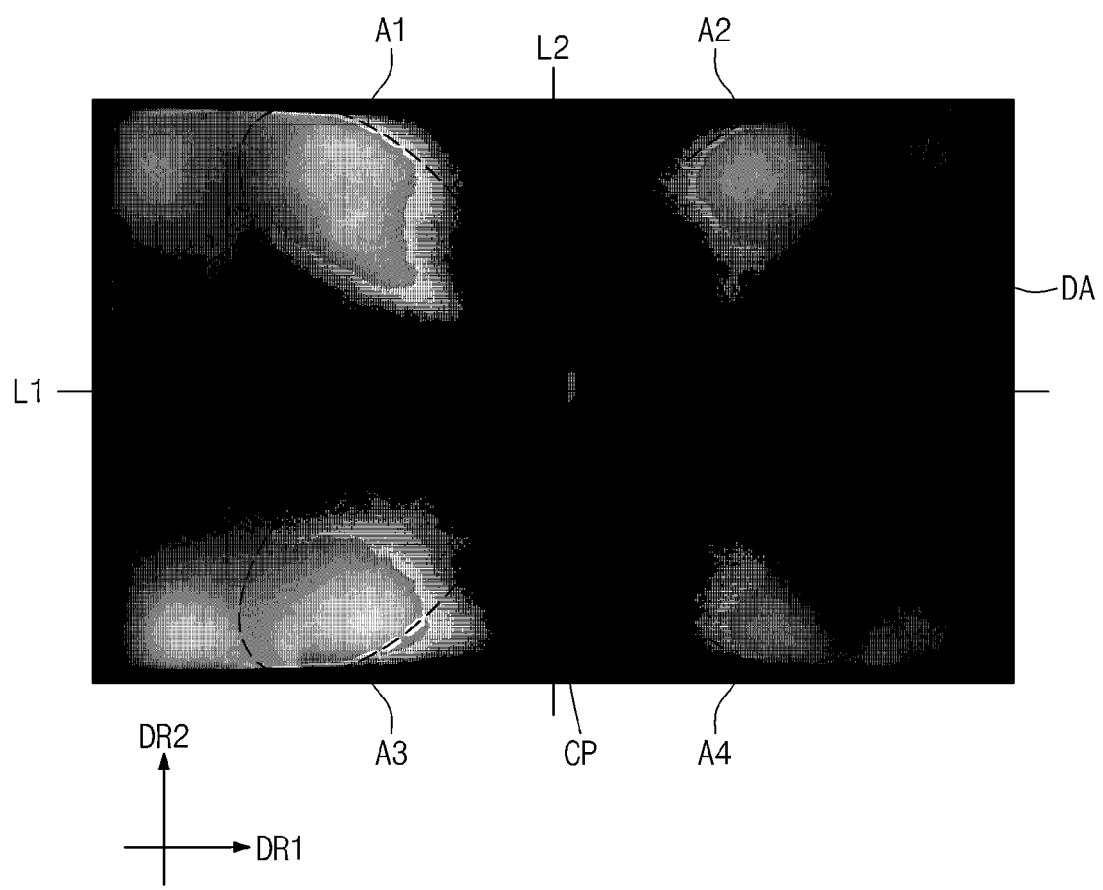
FIG. 4A is a photograph of a display panel displaying black in accordance with a comparative example.
Figure 4B:
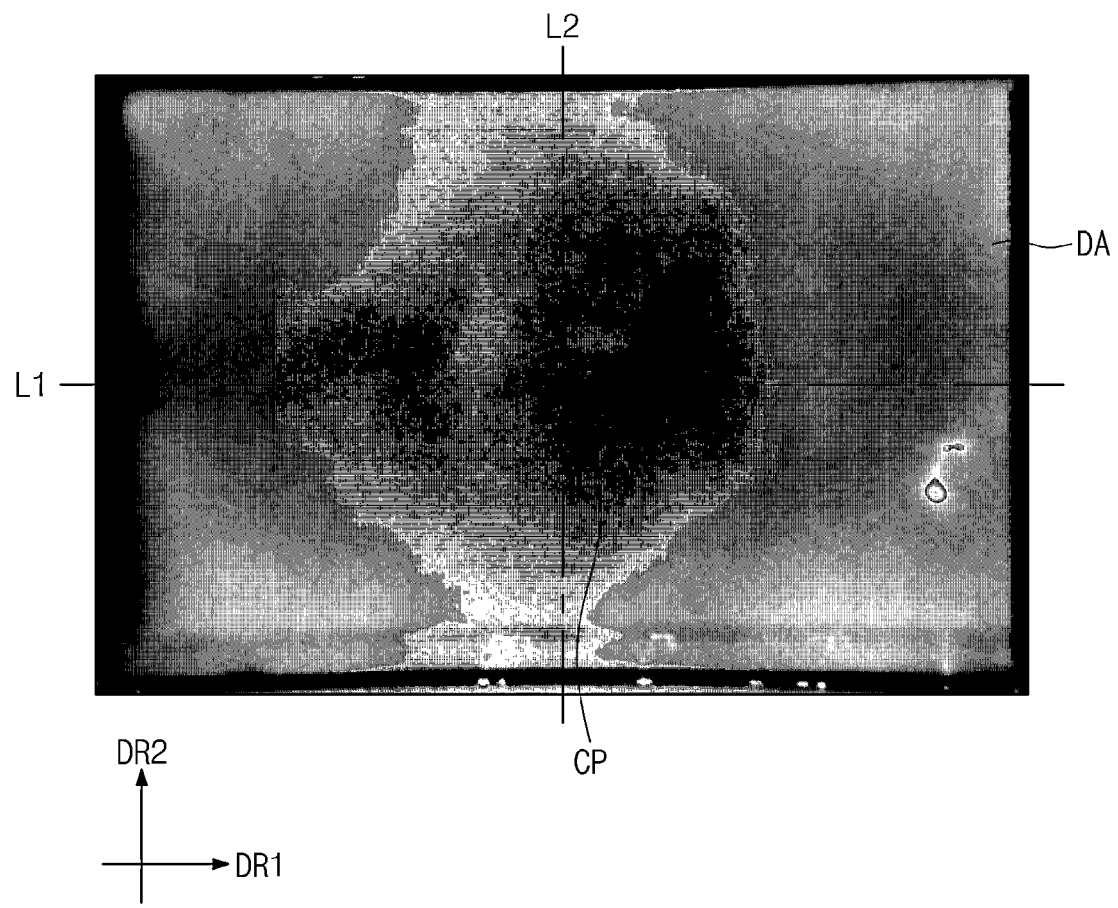
FIG. 4B is a photograph of a display panel displaying a black in accordance with the invention.

FIG. 4A is a photograph of a display panel displaying a black in accordance with a comparative example. FIG. 4B is a photograph of a display panel displaying a black in accordance with the invention.

Referring to FIG. 4A, the display panel is driven so that black is displayed in the display area DA of the display panel, and the display panel has the single-curved structure. If a phenomenon that is more brightly seen than a peripheral area is defined as a light leakage, the light leakage is generated in first through fourth areas A1, A2, A3 and A4 of the display area DA.

If a first virtual line L1 which passes through a central point CP of the display area DA and is in parallel to the first direction DR1, and a second virtual line L2 which passes through a central point CP of the display area DA and is in parallel to the second direction DR2 perpendicular to the first direction DR1 are defined, a location of the first area A1 is symmetrical to a location of the third area A3 with respect to the first virtual line L1 and a location of the second area A2 is symmetrical to a location of the fourth area A4 with respect to the first virtual line L1. A location of the first area A1 is symmetrical to a location of the second area A2 with respect to the second virtual line L2 and a location of the third area A3 is symmetrical to a location of the fourth area A4 with respect to the second virtual line L2.

Thus, if the display panel has the single-curved structure, a stress is concentrated on parts in the display area DA which are symmetrical to the first direction DR1 and the second direction DR2 and thereby the light leakage can be generated.

Referring to FIG. 4B, an exemplary embodiment of the display panel 520 is driven so that black is displayed in the display area DA of the display panel 520, and the display panel 520 has the double-curved structure. In the exemplary embodiment of the display panel 520 according to the invention, the light leakage is not generated and black is uniformly displayed across substantially an entirety of the display area DA. This means that where the display panel 520 has a bent shape along the first and second directions DR1 and DR2, a stress being applied to the display panel 520 is minimized and thereby generation of the light leakage is reduced or effectively prevented.

Referring back to FIG. 3, as described above, the second curvature radius of the shorter side E2 is greater than the first curvature radius of the longer side E1. The second curvature radius may be from three to fifty times as large as the first curvature radius. In exemplary embodiments, for example, the first curvature radius may be from about 2 meters to about 10 meters. When the first and second curvature radii satisfy the conditions described above, a test result that brightness of the light leakage is minimized is described with reference to FIGS. 5A and 5B.

Figure 5A:
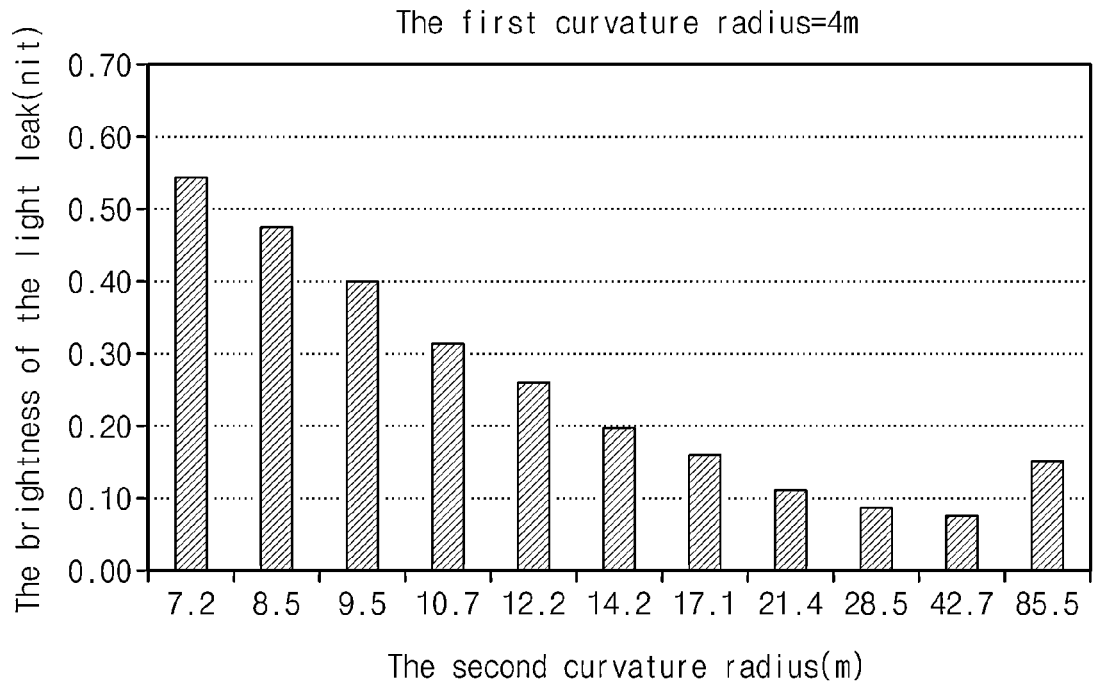
FIGS. 5A and 5B are graphs representing brightness (nit) of a light leak in a display area in which a black is displayed according to a size of a second radius of curvature (meters:m).
Figure 5B:
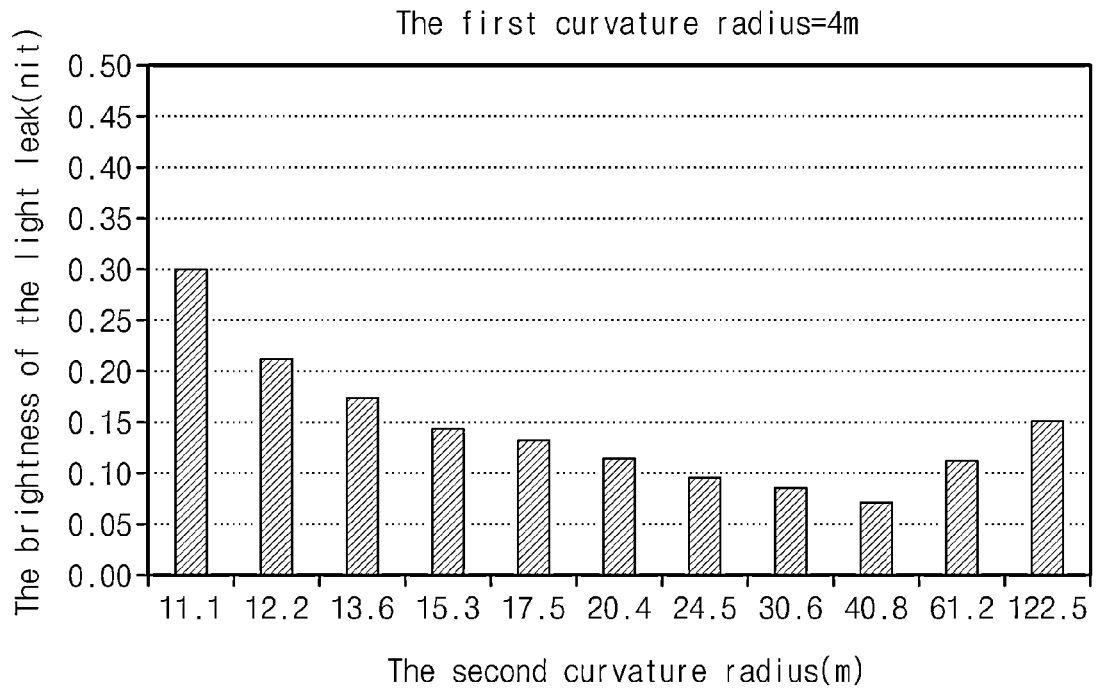

FIGS. 5A and 5B are graphs representing brightness (nit) of a light leakage in a display area in which black is displayed according to a size of a second radius of curvature in meters (m). In each of FIGS. 5A and 5B, brightness of the light leakage measured in the third area A3 illustrated in FIG. 4A is represented.

Referring to FIGS. 3 and 5A, in the display panel 520 of 46 inches, the first curvature radius of the longer side E1 of the display panel 520 is 4 meters. Based on the display panel 520 driven so that black is displayed in the display area DA, FIG. 5A shows brightness of the light leakage in the display area DA represented according to a size of the second curvature radius of the shorter side E2 of the display panel 520.

If the brightness of the light leakage is greater than 0.27 nit, the light leakage is considered a fail and if the brightness of the light leak is smaller than 0.27 nit, the light leakage is not considered a fail. Referring to FIG. 5A, if the second curvature radius is from about 7.2 meters to about 10.7 meters, the brightness of the light leakage is from about 0.31 to about 0.54. Thus, if the second curvature radius is about three times as large as the first curvature radius or less, the light leakage is considered a fail.

Referring again to FIG. 5A, if the second curvature radius is from about 12.2 meters to about 85.5 meters, the brightness of the light leakage is from about 0.15 to about 0.26. Thus, if the second curvature radius is from about three times to about 22 times as large as the first curvature radius, the light leakage is weakly generated and considered not to be a fail.

Referring to FIGS. 3 and 5B, in the display panel 520 of 55 inches, the first curvature radius of the longer side E1 of the display panel 520 is 4 meters. Based on the display panel 520 driven so that black is displayed in the display area DA, FIG. 5B shows brightness of the light leakage in the display area DA represented according to a size of the second curvature radius of the shorter side E2 of the display panel 520.

Referring to FIG. 5B, if the second curvature radius is about 11.1 meters, the brightness of the light leak is about 0.30. Thus, if the second curvature radius is about three times as large as the first curvature radius or less, the light leak may be considered a fail.

Referring again to FIG. 5B, if the second curvature radius is from about 12.2 meters to about 122.5 meters, the brightness of the light leak is from about 0.07 to about 0.21. Thus, if the second curvature radius is from about three times to about 30 times as large as the first curvature radius, the light leak is weakly generated and considered not to be a fail.

Figure 6B:
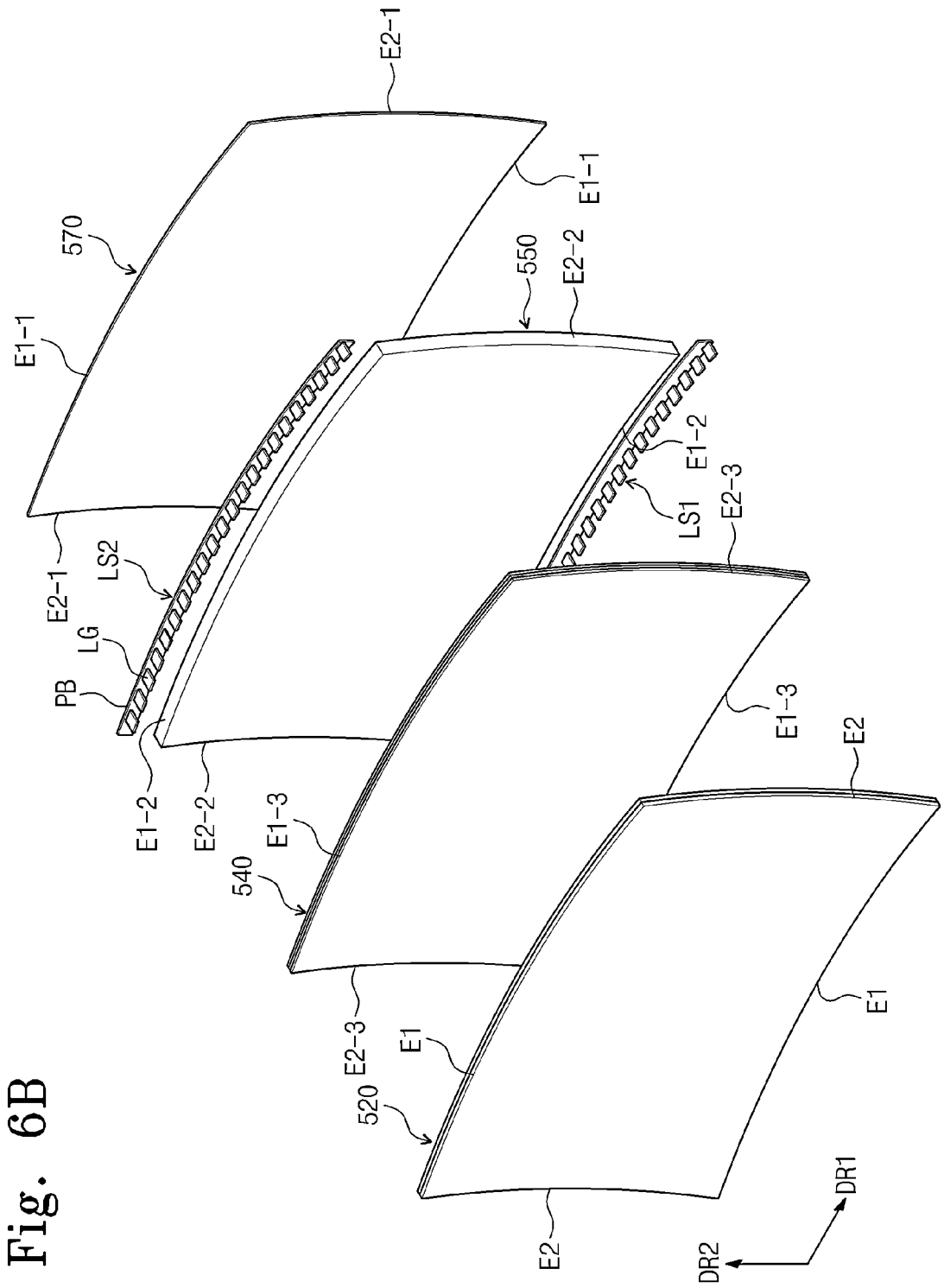
FIG. 6B is an enlarged perspective view of an exemplary embodiment of a light guide plate, a reflection member, a first light source, a second light source and multiple sheets illustrated in FIG. 2A.

FIG. 6A is an enlarged perspective view of an exemplary embodiment of a cover member, a mold frame and a receiving member illustrated in FIG. 2A. FIG. 6B is an enlarged perspective view of an exemplary embodiment of a light guide plate, a reflection member, a first light source, a second light source and multiple sheets illustrated in FIG. 2A.

Referring to FIG. 6A, each of the cover member 510, the mold frame 530 and the receiving member 580 can have a bent shape to correspond to a bent shape of the display panel 520.

The receiving member 580 includes the bottom portion 585, and first through fourth side walls 581-1, 581-2, 581-3 and 581-4 each extending from the bottom portion 585. Locations of the first and second sidewalls 581-1 and 581-2 correspond to respective locations of the two longer sides E1 of the display panel 520. Locations of the third and fourth sidewalls 581-3 and 581-4 correspond to respective locations of the two shorter sides E2 of the display panel 520.

Each of the first and second sidewalls 581-1 and 581-2 can have a bent shape along the first direction DR1 and the third and fourth sidewalls 581-3 and 581-4 can have a bent shape along the second direction DR2. Each of two longer sides of the bottom portion 585 can have a bent shape along the first direction DR1 and each of two shorter sides of the bottom portion 585 can have a bent shape along the second direction DR2.

The mold frame 530 includes first through fourth frame members F1, F2, F3 and F4. Locations of the first and second frame members F1 and F2 correspond to respective locations of the two longer sides E1 of the display panel 520 and locations of the third and fourth frame members F3 and F4 correspond to respective locations of the two shorter sides E2 of the display panel 520.

The first and second frame members F1 and F2 can have a bent shape along the first direction DR1 and the third and fourth frame members F3 and F4 can have a bent shape along the second direction DR2.

The cover member 510 includes first through fourth cover portions 510-1, 510-2, 510-3 and 510-4. Locations of the first and second cover portions 510-1 and 510-2 correspond to respective locations of the two longer sides E1 of the display panel 520 and locations of the third and fourth cover portions 510-3 and 510-4 correspond to respective locations of the two shorter sides E2 of the display panel 520.

Each of the first and second cover portions 510-1 and 510-2 can have a bent shape along the first direction DR1 and the third and fourth cover portions 510-3 and 510-4 can have a bent shape along the second direction DR2.

As described above, each of the cover member 510, the mold frame 530 and the receiving member 580 can have a bent shape to correspond to a bent shape of the display panel 520. Thus, where the display panel 520 is combined with the cover member 510, the mold frame 530 and the receiving member 580, a bent shape of the display panel 520 can be easily maintained.

Referring to FIG. 6B, each of the reflecting plate 570, the light guide plate 550 and the multiple sheets 540 can have a bent shape to correspond to a bent shape of the display panel 520.

The reflecting plate 570 has first longer sides E1-1 and first shorter sides E2-1. The first longer sides E1-1 are bent along the first direction DR1 and the first shorter sides E2-1 are bent along the second direction DR2. The light guide plate 550 has second longer sides E1-2 and second shorter sides E2-2. The second longer sides E1-2 are bent along the first direction DR1 and the second shorter sides E2-2 are bent along the second direction DR2. The multiple sheets 540 each have third longer sides E1-3 and third shorter sides E2-3. The third longer sides E1-3 are bent along the first direction DR1 and the third shorter sides E2-3 are bent along the second direction DR2.

Each of the first and second light sources LS1 and LS2 includes the printed circuit board PB and the multiple light emitting diode packages LG. The printed circuit board PB is bent along the first direction DR1 to correspond to the bent shape of the second longer side E1-2 of the light guide plate 550.

As described above, each of the reflecting plate 570, the light guide plate 550, the multiple sheets 540 and the printed circuit board PB is bent to correspond to the bent shape of the display panel 520. Accordingly, a separation distance between the display panel 520 and the multiple sheets 540 can be maintained constant and thereby light can be uniformly provided across the display area DA of the display panel 520.

Figure 7:
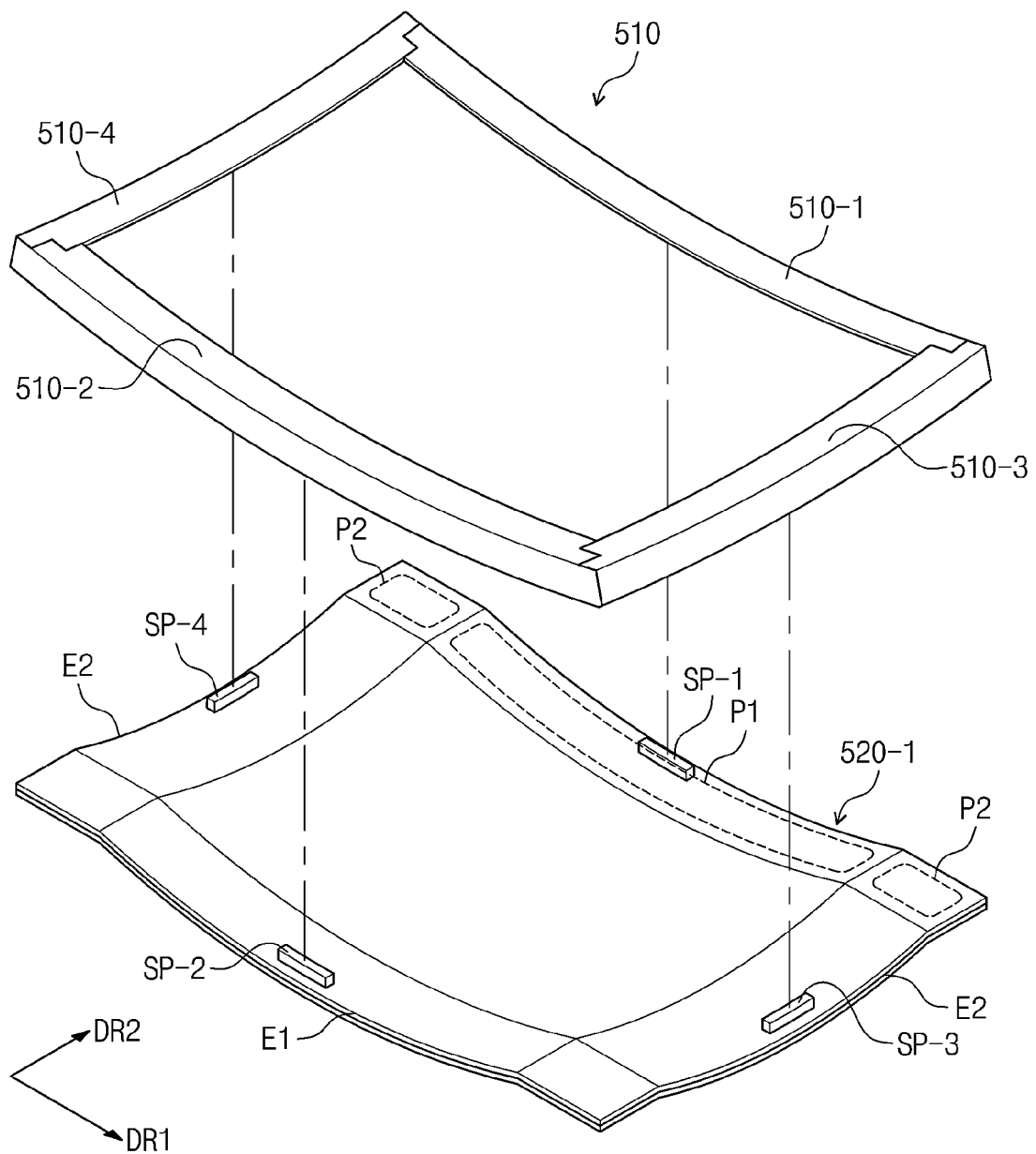
FIG. 7 is an exploded perspective view of another exemplary embodiment of a cover member and a display panel of a curved display device in accordance with the invention.

FIG. 7 is an exploded perspective view of another exemplary embodiment of a cover member and a display panel of a curved display device in accordance with the invention.

Referring to FIG. 7, a curved display device includes first through fourth spacers SP1, SP2, SP3 and SP4 disposed between the cover member 510 and a display panel 520-1. Since the structure and function of the spacers are the same, the first spacer SP1 among the first through fourth spacers SP1, SP2, SP3 and SP4 is described as an illustration.

The first spacer SP1 may include an elastic material such as rubber or silicon. The first spacer SP1 is provided on a central portion of a border of the display panel 520-1 adjacent to the longer side E1 to be interposed between the display panel 520-1 and the cover member 510. The display panel 520-1 may be curved to some degree along an entirety of the longer side E1. Where the display panel 520-1 is combined with the cover member 510, the first spacer SP1 can partially pressurize the display panel 520-1.

With reference to a lower surface of the curved cover member 510, a distance between the display panel 520-1 and the lower surface is greatest at the spacer and decreases along a respective side of the display panel 520-1. The spacer may contact the lower surface of the curved cover member 510 and an upper surface of the display panel 520-1. Where the spacer is between the lower surface of the curved cover member 510 and the upper surface of the display panel 520-1, the spacer applies a force to the display panel 520-1 to pressurize the display panel 520-1 and increase a distance between the display panel 520-1 and the lower surface of the curved cover member 510 starting at the location of the spacer.

Thus, referring to FIG. 7, if a first border P1 and a second border P2 of the display panel 520-1 are defined along both the longer and shorter sides E1 and E2, a distance between the first border P1 and the first spacer SP1 is smaller than a distance between the second border P2 and the first spacer SP1. Therefore, a curvature of the first border P1 of the display panel 520-1 is greater than a curvature of the second border P2 of the display panel 520-1. As described above, where first through fourth spacers SP1, SP2, SP3 and SP4 are applied to the curved display device, a curvature of specific parts of the display panel 520-1, along the longer side E1 and/or the shorter side E2, can be controlled differently than curvatures of other parts.

Figure 8:
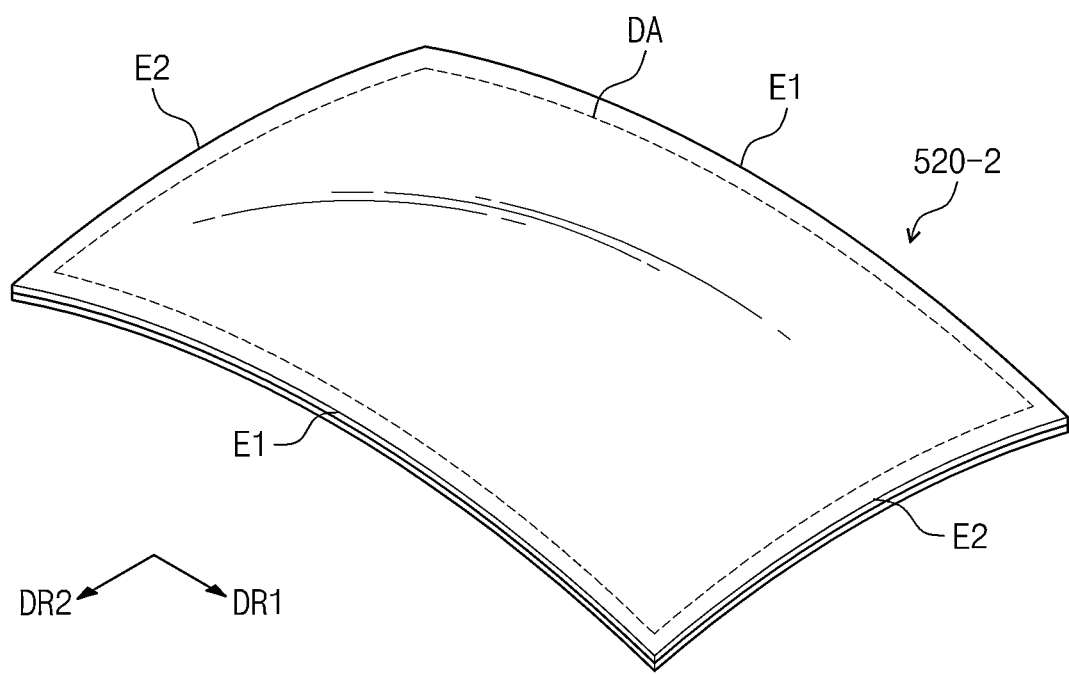
FIG. 8 is a perspective view of still another exemplary embodiment of a display panel of a curved display device in accordance with the invention.

FIG. 8 is a perspective view of still another exemplary embodiment of a display panel of a curved display device in accordance with the invention.

Referring to FIG. 8, a display panel 520-2 has a bent shape along the first and second directions DR1 and DR2. Thus, each of two longer sides E1 of the display panel 520-2 is bent and each of two shorter sides E2 of the display panel 520-2 is bent.

Unlike the exemplary embodiment described in relation to FIG. 3, the display panel 520-2 is bent and thereby a display area DA has a convex shape. The overall curved display device including the display panel 520-2 can be easily installed on a structure having a convex shape, such as a column or a pillar.

If a longer side E1 of the display panel 520-2 has a first curvature radius and a shorter side E2 of the display panel 520-2 has a second curvature radius, the second curvature radius is greater than the first curvature radius. The second curvature radius can be from about 3 times to about 50 times as large as the first curvature radius. In exemplary embodiments, for example, the first curvature radius can be from about 2 meters to about 10 meters.

As described above, since the display panel 520-2 has a double-curved structure, brightness of a light leakage generated by a stress applied to the display panel 520-2 is minimized and thereby display quality of an image being displayed on the display panel 520-2 can be improved.

According to one or more exemplary embodiment of the invention, if a display panel is bent along both a longer side and a shorter side, a stress applied to a base substrate of the display panel is reduced and thereby retardation of light passing through the base substrate can be reduced or effectively prevented. Accordingly, brightness of a light leakage generated in the display panel by the retardation can be minimized and thereby display quality of the curved display device can be improved.

Each of a receiving member receiving a display panel and a cover member covering the display panel is bent to correspond to a bent shape of the display panel, and thereby the bent shape of the display panel in the curved display apparatus can be maintained by the receiving member and the cover member.

Where a curved display device further includes a backlight, elements of the backlight are bent to correspond to the bent shape of the display panel and thereby light can be uniformly provided across a display area of the display panel.

The above-disclosed subject matter is to be considered illustrative, and not restrictive, and the appended claims are intended to cover all such modifications, enhancements, and other exemplary embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A curved display device comprising:
a display panel comprising a display area on which an image is displayed, a longer side and a shorter side;
a receiving member which receives the display panel; and
a cover member which covers a border of the display panel and is combined with the receiving member,
wherein
each of the longer side and the shorter side is curved to define a three-dimensional curved shape of the display panel,
the longer side has a first curvature radius from one edge of the longer side to an opposing edge of the longer side,
the shorter side has a second curvature radius from one edge of the shorter side to an opposing edge of the shorter side, and
each of the receiving member and the cover member is curved and maintains the curved shape of the display panel.

2. The curved display device of claim 1, wherein
the display panel is curved along a first direction and a second direction which crosses the first direction,
the longer side of the display panel is curved along the first direction, and
the shorter side of the display panel is curved along the second direction.

3. The curved display device of claim 2, wherein the first direction is perpendicular to the second direction.

4. The curved display device of claim 3, wherein
a first virtual line passes through a central point of the display area and is parallel to the first direction,
a second virtual line passes through the central point of the display area and is parallel to the second direction, and the display panel is symmetrically curved with respect to the first and second virtual lines, respectively.

5. The curved display device of claim 2, wherein the second curvature radius is greater than the first curvature radius.

6. The curved display device of claim 5, wherein the second curvature radius is from about 3 times to about 50 times greater than the first curvature radius.

7. The curved display device of claim 6, wherein the first curvature radius is about 2 meters to about 10 meters.

8. The curved display device of claim 2, wherein a first portion of the longer side or the shorter side of the display panel is curved to have a different curvature radius from that of a second portion of the respective longer side or shorter side.

9. The curved display device of claim 2,
wherein the receiving member comprises:
a bottom portion; and
multiple sidewalls extending from the bottom portion, wherein
a portion of the sidewalls among the multiple sidewalls, which extends parallel to the longer side of the display panel is curved along the first direction, and
a portion of the sidewalls among the multiple sidewalls, which extends parallel to the shorter side of the display panel is curved along the second direction.

10. The curved display device of claim 9, further comprising a mold frame which is combined with the receiving member and supports the display panel,
wherein the mold frame comprises:
a first frame which is curved along the first direction; and
a second frame which is curved along the second direction.

11. The curved display device of claim 2, wherein the cover member comprises:
a first cover portion which is curved along the first direction and overlaps the longer side of the display panel; and
a second cover portion which is curved along the second direction and overlaps the shorter side of the display panel.

12. The curved display device of claim 2, further comprising a backlight which is received in the receiving member, and generates and outputs light to the display panel,
wherein the display panel is a liquid crystal display panel which receives the light to display the image.

13. The curved display device of claim 12, wherein the backlight comprises:
a light source which generates the light; and
a light guide plate which guides the light generated from the light source toward the display panel,
wherein a longer side of the light guide plate is curved along the first direction and a shorter side of the light guide plate is curved along the second direction.

14. The curved display device of claim 13, wherein the backlight further comprises:
an optical sheet between the light guide plate and the display panel; and
a reflecting plate facing the optical sheet with the light guide plate between the reflecting plate and the optical sheet,
wherein a longer side of the optical sheet and a longer side of the reflecting plate are curved along the first direction, and a shorter side of the optical sheet and a shorter side of the reflecting plate are curved along the second direction.

15. The curved display device of claim 13, wherein the light source is adjacent to a side portion of the light guide plate.

16. The curved display device of claim 15, wherein the light source comprises:
a printed circuit board extending along the side portion of the light guide plate; and
multiple light emitting diode packages on the printed circuit board, wherein the printed circuit board is curved along the longer side of the light guide plate or the shorter side of the light guide plate.

17. The curved display device of claim 1, wherein the display panel is an organic electroluminescence display panel.

18. The curved display device of claim 1, wherein the display panel is curved such that the display area has a concave shape.

19. The curved display device of claim 1, wherein the display panel is curved such that the display area has a convex shape.

20. The curved display device of claim 1, further comprising a spacer between the cover member and the display panel and at the longer side or the shorter side of the display panel,
wherein a first portion of the respective longer side or the shorter side of the display panel at which the spacer is disposed, is curved to have a different curvature radius from that of a second portion of the respective longer side or shorter side at which the spacer is not disposed.

21. A curved display device comprising:
a display panel comprising a display area on which an image is displayed, a longer side and a shorter side, wherein
each of the longer side and the shorter side is curved to define a three-dimensional curved shape of the display panel,
the longer side has a first curvature radius from one edge of the longer side to an opposing edge of the longer side,
the shorter side has a second curvature radius from one edge of the shorter side to an opposing edge of the shorter side, and
a straight line, which passes through a central point of the display panel and is parallel to the longer side or the shorter side in a plan view, is defined, and the display area is symmetrical with respect to the straight line to have a concave shape.

* * * * *